US012734541B2

(12) United States Patent
Fan

(10) Patent No.: US 12,734,541 B2
(45) Date of Patent: Sep. 15, 2026

(54) SUCTION PIPE ROTATING DEVICE, AND SPRAY GUN WITH SAME

(71) Applicant: Jidong Fan, Ningbo (CN)

(72) Inventor: Jidong Fan, Ningbo (CN)

(73) Assignee: NINGBO JINGCHEN TECHNICAL SERVICE CO., LTD, Ningbo (CN)

( * ) Notice: Subject to any disclaimer, the term of this patent is extended or adjusted under 35 U.S.C. 154(b) by 102 days.

(21) Appl. No.: 18/895,377

(22) Filed: Sep. 24, 2024

(65) Prior Publication Data

US 2025/0010324 A1 Jan. 9, 2025

(30) Foreign Application Priority Data

Aug. 15, 2024 (CN) ......................... 202421994071.3

(51) Int. Cl.
*B05B 15/30* (2018.01)
*B05B 7/24* (2006.01)

(52) U.S. Cl.
CPC ............ *B05B 15/30* (2018.02); *B05B 7/2402* (2013.01); *B05B 7/2408* (2013.01)

(58) Field of Classification Search
CPC ..... B05B 15/30; B05B 7/2402; B05B 7/2408; B05B 7/2427
USPC ... 222/382, 320, 321.7, 383.1, 464.1, 463.3, 222/463.7
See application file for complete search history.

(56) References Cited

U.S. PATENT DOCUMENTS

| | | | | |
|---|---|---|---|---|
| 2,079,933 | A * | 5/1937 | Fisher | B05B 7/066 239/375 |
| 5,655,714 | A * | 8/1997 | Kieffer | B05B 7/2402 239/340 |
| 6,027,041 | A * | 2/2000 | Evans | B65D 83/38 222/464.6 |
| 8,181,831 | B2 * | 5/2012 | Chapin | B05B 11/0037 222/321.5 |
| 2020/0055071 | A1 * | 2/2020 | Lam | B05B 12/36 |

* cited by examiner

*Primary Examiner* — David J Walczak
(74) *Attorney, Agent, or Firm* — JEEN IP LAW, LLC

(57) ABSTRACT

A suction pipe rotating device, and a spray gun with same. The device includes: a rotary knob rotatably arranged at a top of a gun body of the spray gun; a rotary connecting portion, where one end of the rotary connecting portion is arranged on the rotary knob and is movably inserted into a material suction hole of the spray gun; and an angle suction pipe including a straight pipe and an inclined pipe that are connected to each other, where the straight pipe is rotatably arranged in the material suction hole and is connected to the other end of the rotary connecting portion, the inclined pipe is obliquely arranged, and an end of the inclined pipe is close to a joint between a side wall and a bottom of a material barrel of the spray gun.

9 Claims, 9 Drawing Sheets

SUCTION PIPE ROTATING DEVICE, AND SPRAY GUN WITH SAME

TECHNICAL FIELD

The disclosure relates to a spray gun, and particularly relates to a suction pipe rotating device, and a spray gun with same.

BACKGROUND

A spray gun actually works at angles of upward and downward spraying, that is, a material barrel is tilted. In this case, liquid raw materials in the material barrel will converge to the lowest position of the material barrel due to the change of the angle of the spray gun. A suction pipe in the existing spray gun is generally a straight pipe, which has the problem that when there is not much raw material left in the material barrel, the remaining raw material is concentrated in the corner of the tilted side, causing that a large amount of raw material cannot be sucked up properly. In order to solve the problem, a flexible suction pipe has appeared, such as a spray gun capable of freely swinging a suction pipe disclosed in CN209317956U, which uses the flexible suction pipe, and a gravity ball is connected to the bottom of the flexible suction pipe. When the spray gun works tilted, the raw materials in the material barrel will converge to the lowest position of the material barrel under the action of gravity, and the gravity ball will also move to the lowest position of the material barrel under the action of gravity, so as to drive the flexible suction pipe to bend. Then, a feeding end of the flexible suction pipe can always be located at the lowest position of the material barrel, and the situation that the raw materials cannot be sucked when the material barrel is tilted is avoided. But the spray gun has shortcomings:

1. The flexible body gravity swing is affected by viscosity of raw materials, when the viscosity of the raw materials is high, the swing is not spontaneous, and the liquid contact for feeding cannot be performed quickly and effectively.

2. When the flexible suction pipe is longer, the feeding end will rise upwards, and a certain amount of raw materials can not be sucked up when the material barrel is in a horizontal state. When the flexible suction pipe is shorter, the flexible suction pipe swings to an edge of the material barrel under the action of the gravity ball, but it cannot fall to the lowest position, and cannot completely suction the materials, and the remaining of raw materials is more, as shown in FIG. 14.

3. It is difficult to control the hardness of the flexible suction pipe, a too soft flexible suction pipe will be pressed by pressure in the material barrel, hindering feeding, and a too hard flexible suction pipe does not swing freely.

SUMMARY

In order to solve the problems that a flexible suction pipe cannot swing freely due to an influence of viscosity of raw materials, remaining raw materials are more, and hardness is difficult to control, the disclosure provides a suction pipe rotating device. A specific technical solution is as follows:

The suction pipe rotating device includes: a rotary knob rotatably arranged at a top of a gun body of the spray gun; a rotary connecting portion, where one end of the rotary connecting portion is arranged on the rotary knob and is movably inserted into a material suction hole of the spray gun; and an angle suction pipe including a straight pipe and an inclined pipe that are connected to each other, where the straight pipe is rotatably arranged in the material suction hole and is connected to the other end of the rotary connecting portion, the inclined pipe is obliquely arranged, and an end of the inclined pipe is close to a joint between a side wall and a bottom of a material barrel of the spray gun.

Preferably, the rotary connecting portion includes: a connecting support rotatably arranged in the material suction hole; and a connecting rod, where one end of the connecting rod is arranged on the connecting support, and the other end of the connecting rod is connected to the straight pipe.

Preferably, the suction pipe rotating device further includes a positioning sleeve arranged on the top of the gun body and rotatably located between the rotary knob and the rotary connecting portion for limiting an axial position of the rotary connecting portion.

Preferably, the suction pipe rotating device further includes a suction pipe fitting sleeve arranged in the material suction hole of the spray gun, where the suction pipe fitting sleeve is internally provided with a positioning ring and several connecting ribs connected to the positioning ring and the suction pipe fitting sleeve separately, and the rotary connecting portion is rotatably inserted into the positioning ring.

Preferably, the suction pipe rotating device further includes a rotary connecting seat arranged at a bottom of the rotary connecting portion, where several drive plates are arranged on the rotary connecting seat, and the drive plates are movably inserted into a drive groove at a top of the straight pipe.

Preferably, several external connecting teeth are arranged in an annular array on the rotary connecting portion, a connecting hole is arranged on the rotary connecting seat, several internal connecting teeth are arranged in an annular array on the connecting hole, the rotary connecting portion is inserted into the connecting hole, and the external connecting teeth mesh with the internal connecting teeth.

Preferably, a feeding end of the inclined pipe is provided with a material suction slope configured to reduce a gap between an end of the inclined pipe and the material barrel.

Preferably, several first sealing rings are arranged between the rotary connecting portion and the material suction hole; and several second sealing rings are arranged between the straight pipe and the suction pipe fitting sleeve.

A spray gun includes: the suction pipe rotating device above; and a sealing device arranged between a gun body and a material barrel.

Preferably, the sealing device includes: a seal ring arranged on the gun body and located at a top of the material barrel; a sealing disk arranged on the sealing ring and provided with a fourth sealing groove, and a second vent hole and several vent posts arranged at a bottom of the fourth sealing groove; and a sealing gasket hermetically arranged on the fourth sealing groove and provided with several vent slits, where the vent slits are located between adjacent vent posts.

Compared with the prior art, the disclosure has the following beneficial effects:

According to the suction pipe rotating device provided in the disclosure, an angle of the suction pipe can be conveniently adjusted, the suction pipe is always located at an edge of the material barrel and thus is always inserted into a raw material, a maximum amount of the material can be sucked, a remaining raw material is reduced, a utilization rate of the raw material, reliability and the stability of material suction are improved, and the suction pipe rotating device is not influenced by viscosity of the raw material and can rotate freely.

DETAILED DESCRIPTIONS OF THE EMBODIMENTS

Figure 1:
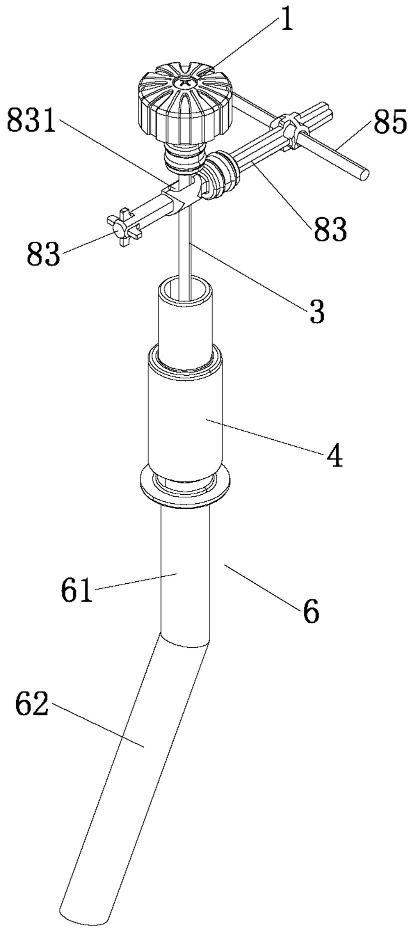
FIG. 1 is a schematic structural diagram of a suction pipe rotating device.

The disclosure will be further elaborated in conjunction with the accompanying drawings.

Example 1

As shown in FIGS. 1-11, a suction pipe rotating device includes a rotary knob 1, a rotary connecting portion 3 and an angle suction pipe 6. The rotary knob 1 is rotatably arranged at a top of a gun body 80 of the spray gun and connected to one end of the rotary connecting portion 3. The rotary connecting portion 3 is movably inserted into a material suction hole 81 of the spray gun. The angle suction pipe 6 includes a straight pipe 61 and an inclined pipe 62 that are connected to each other. The straight pipe 61 is rotatably arranged in the material suction hole 81. A top of the straight pipe 61 is connected to the other end of the rotary connecting portion 3. The inclined pipe 62 is obliquely arranged. An end of the inclined pipe 62 is close to a joint between a side wall and a bottom of a material barrel 91 of the spray gun. An angle between the straight pipe 61 and the inclined pipe 62 is an obtuse angle. The straight pipe 61 and the material suction hole 81 are coaxially arranged and are in a vertical state. The inclined pipe 62 is in an inclined state and inclined towards the joint between the side wall and the bottom of the material barrel 91, such that the end of the inclined pipe 62 is close to the joint between the side wall and the bottom of the material barrel 91. When the material barrel 91 is inclined, the inclined pipe can rotate to the inside of a raw material to suck the raw material, so as to reduce the remaining raw material.

The rotary connecting portion 3 passes through the gun body 80 and is connected to the angle suction pipe 6, such that the angle suction pipe 6 can be conveniently rotated by means of the rotary knob 1. The rotary knob 1 drives the angle suction pipe 6 to rotate at any angle in the material barrel 91 by means of the rotary connecting part portion 3, and a position of the feeding end of the angle suction pipe 6 can be flexibly adjusted according to an inclined state of the material barrel 91 during operation, such that the feeding end of the angle suction pipe 6 can always be located inside the liquid raw material, and it is guaranteed that the raw material can be sufficiently sucked, the remaining raw material is reduced, and a utilization rate of the raw material is improved.

Figure 2:
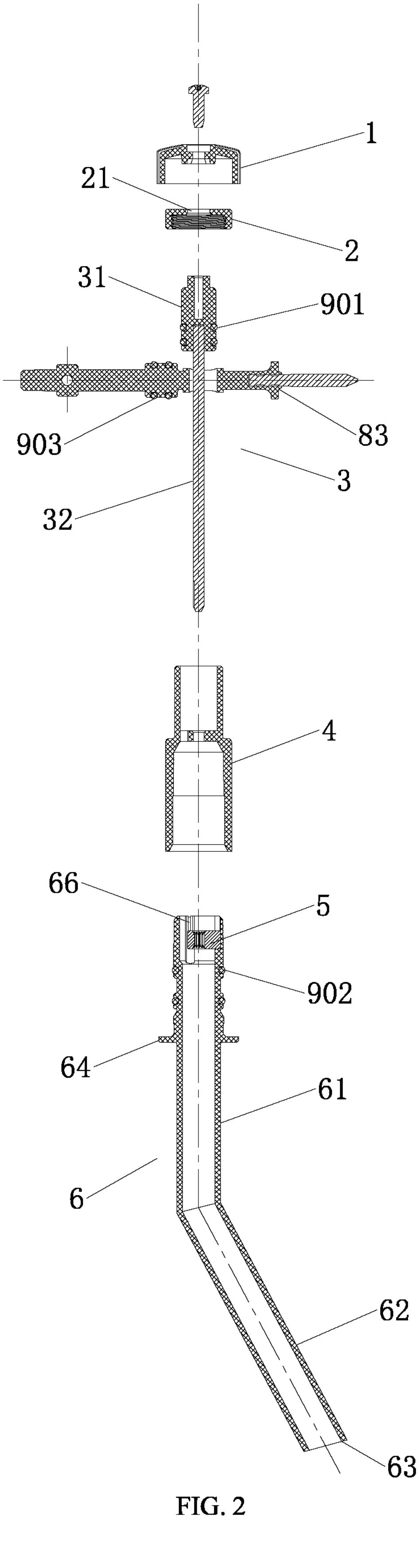
FIG. 2 is a sectional view of a suction pipe rotating device.
Figure 9:
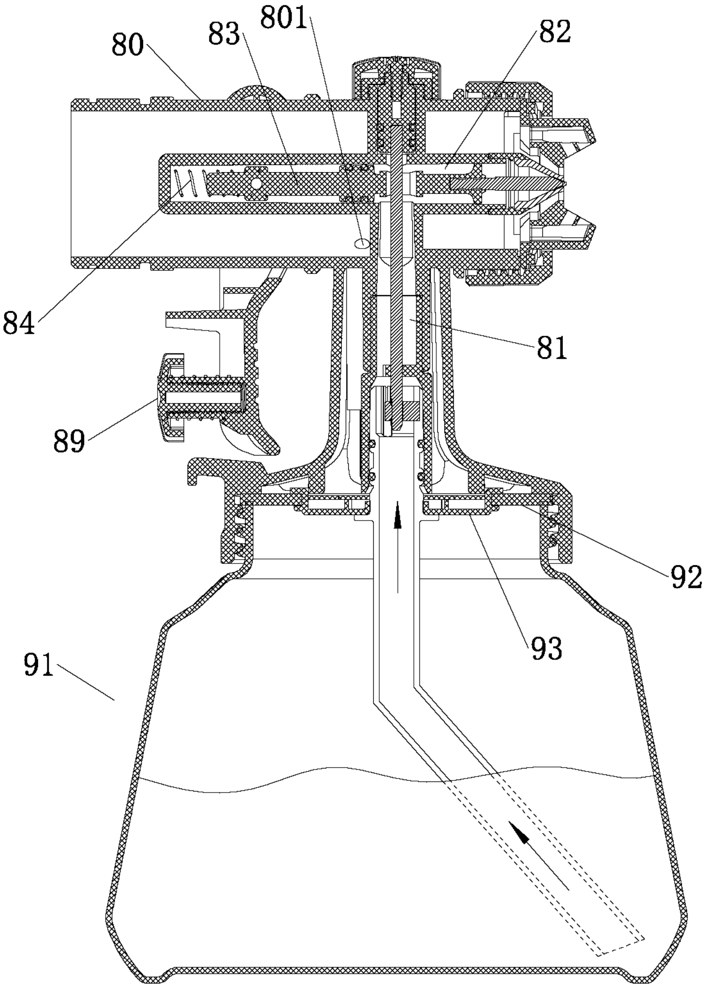
FIG. 9 is a sectional view of a spray gun.
Figure 10:
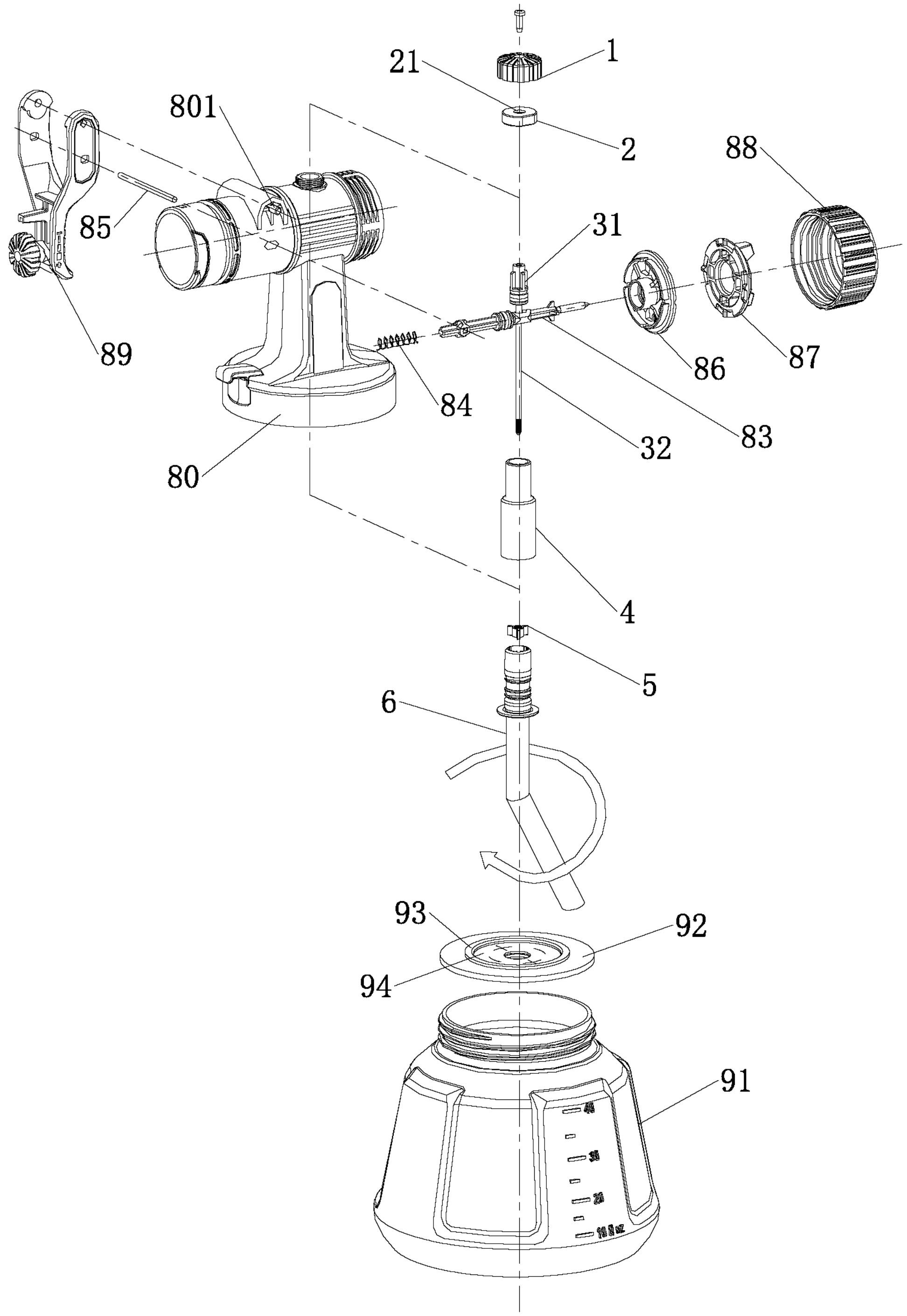
FIG. 10 is an exploded view of a spray gun.
Figure 11:
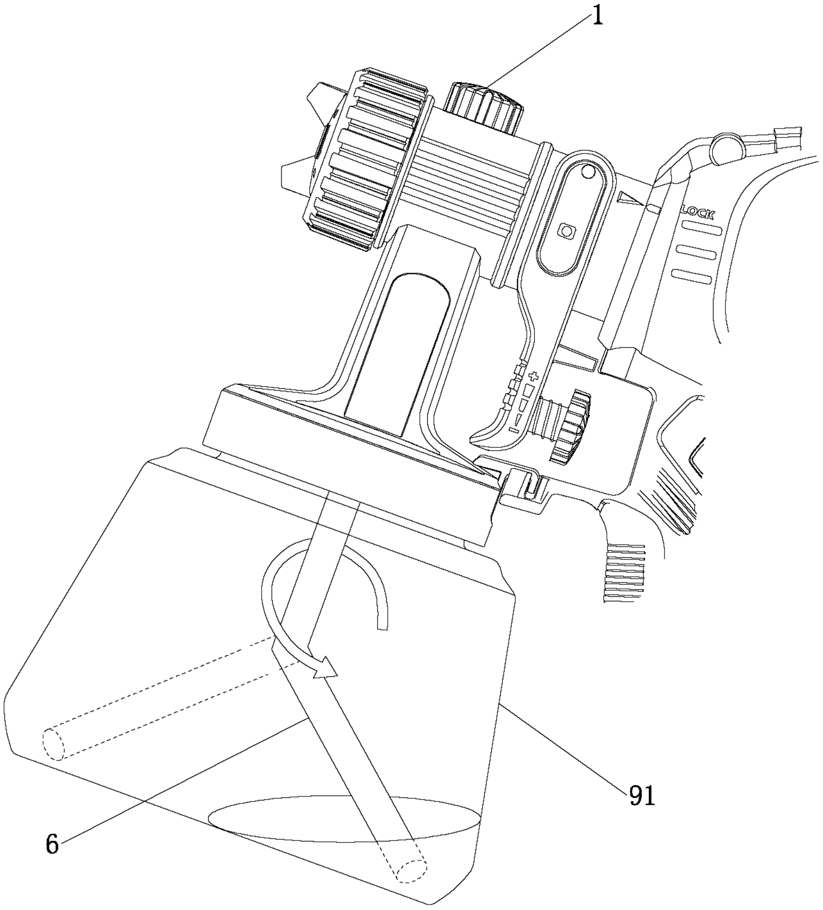
FIG. 11 is a schematic view of a spray gun in an inclined state.
Figure 12:
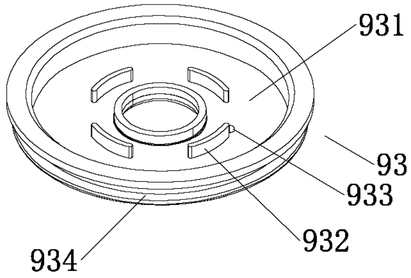
FIG. 12 is a schematic structural diagram of a sealing disk.
Figure 13:
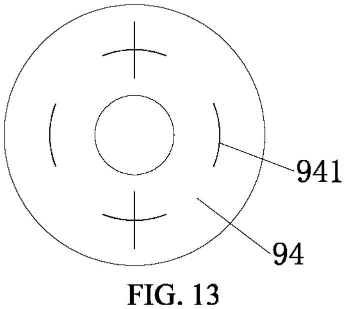
FIG. 13 is a schematic structural diagram of a sealing gasket.
Figure 14:
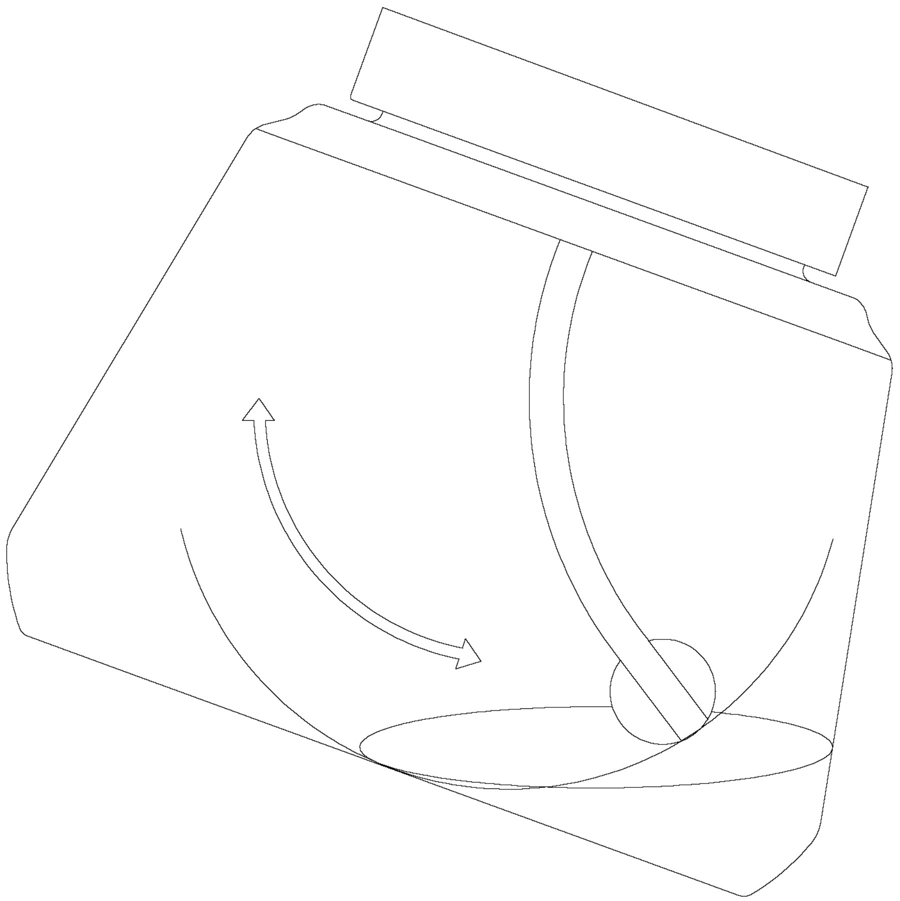
FIG. 14 is a schematic diagram showing that a flexible suction pipe cannot fall at a lowest position of a material barrel in the prior art.

As shown in FIGS. 2 and 9, in order to suck the raw material to a maximum extent and reduce the remaining raw material, the feeding end of the inclined pipe 62 is provided with a material suction slope 63. The material suction slope 63 is configured to reduce a gap between the end of the inclined pipe 62 and the material barrel 91, such that the feeding end can be close to the bottom of the material barrel 91 to suck the material to the maximum extent.

Figure 5:
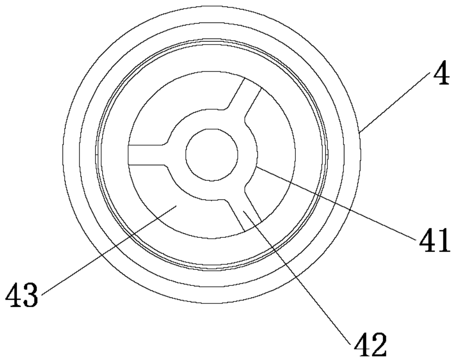
FIG. 5 is a front view of a suction pipe fitting sleeve.

As shown in FIGS. 5 and 9, in order to facilitate radial positioning of the rotary connecting portion 3, the suction pipe rotating device further includes a suction pipe fitting sleeve (4). The suction pipe fitting sleeve (4) is mounted at a bottom of the material suction hole (81) of the spray gun and movably inserted at the other end of the rotary connecting portion (3). The suction pipe fitting sleeve 4 may be connected to the material suction hole 81 through threads, or may be fixedly connected through glue. The suction pipe fitting sleeve 4 is hermetically connected to the material suction hole 81. As shown in FIG. 5, the suction pipe fitting sleeve 4 is internally provided with a positioning ring 41 and a connecting rib 42. The positioning ring 41 is arranged coaxial with the suction pipe fitting sleeve 4, and is connected to the suction pipe fitting sleeve 4 through the connecting rib 42. Three connecting ribs 42 are arranged in an annular array. A material passing groove 43 is formed between adjacent connecting ribs 42. The material passing groove 43 is configured to communicate the material suction hole 81 with the straight pipe 61. The suction pipe fitting sleeve 4, the positioning ring 41 and the connecting ribs 42 are an integral structure. The connecting rod 32 is movably inserted into the positioning ring 41, and a diameter of the positioning ring 41 is slightly greater than that of the connecting rod 32, such that radial positioning of a bottom of the connecting rod 32 can be implemented. The connecting support 31 and the positioning ring 41 implement radial positioning of an upper end and a lower end of the connecting rod 32, such that stability of the connecting rod 32 is improved.

As shown in FIG. 2, two annular second sealing grooves are provided on a top of the straight pipe 61. Second sealing rings 902 are provided in the second sealing grooves. The second sealing rings 902 are movably inserted into the suction pipe fitting sleeve 4 to achieve seal between the suction pipe fitting sleeve 4 and the straight pipe 61.

Figure 3:
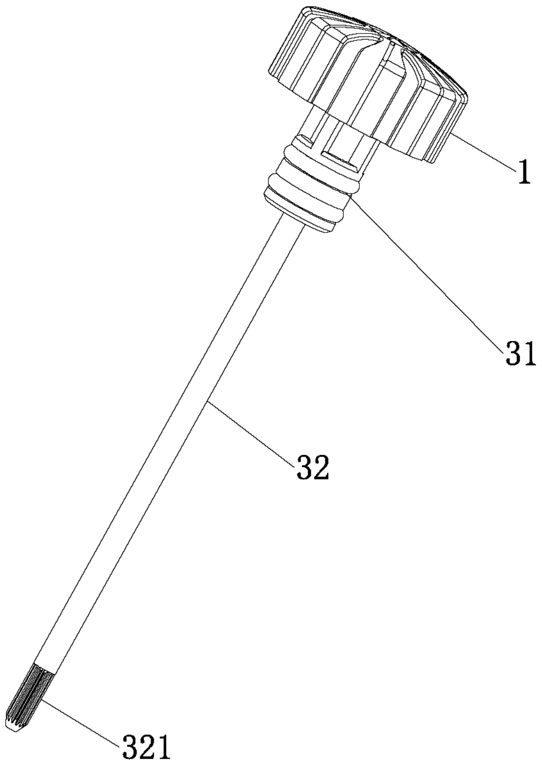
FIG. 3 is an assembly diagram of a rotary knob and a rotary connecting portion.

As shown in FIGS. 2 and 3, the rotary connecting portion 3 includes a connecting support 31 and a connecting rod 32. A top of the connecting support 31 is fixedly connected to the rotary knob 1 through screws. A bottom of the connecting support 31 is fixedly connected to a top of the connecting rod 32. The connecting rod 32 is movably inserted into the material suction hole 81. A diameter of the connecting rod 32 is less than that of the material suction hole 81, so as not to influence material suction of the material suction hole 81. A bottom of the connecting rod 32 is connected to the top of the straight pipe 61. The connecting support 31 is provided with two annular first sealing grooves. The first sealing grooves are internally provided with first sealing rings 901. The first sealing rings 901 are movably inserted into the material suction hole 81 for achieving seal between the connecting support 31 and the material suction hole 81, that is, seal of the top of the material suction hole 81. The connecting support 31 is convenient for sealing, and further convenient for connecting the rotary knob 1 to the connecting rod 32. Therefore, the problem that sealing cannot be implemented since a diameter of the connecting rod 32 is small is solved, strength is also improved, a larger radial force is born, reliability and stability of rotation are improved, and radial positioning of the top of the connecting rod 32 is implemented.

Figure 4:
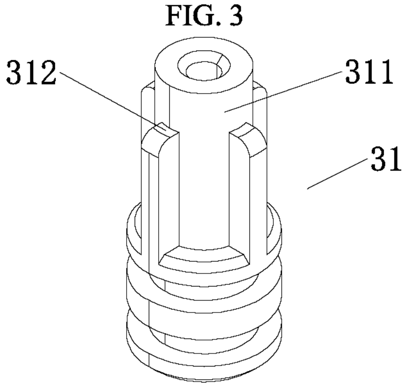
FIG. 4 is a schematic structural diagram of a connecting support.

As shown in FIGS. 2-4, in order to implement axial positioning of the rotary connecting portion 3 and prevent the rotary connecting portion 3 from moving up and down along an axis, a positioning sleeve 2 is further included. One end of the positioning sleeve 2 is mounted on the top of the gun body 80 through threads, and the other end of the positioning sleeve is provided with a rotating hole 21. The top of the connecting support 31 is provided with a rotating post 311. The rotating post 311 is movably inserted into the rotating hole 21. A diameter of the rotating post 311 is less than that of the connecting support 31, such that a shaft shoulder 312 is formed. The shaft shoulder 312 is movably abutted against the inside of the positioning sleeve 2. The rotating post 311 is connected to the rotary knob 1. The rotary knob 1 is movably abutted against a top of the positioning sleeve 2. The positioning sleeve 2 is movably clamped between the rotary knob 1 and the connecting support 31, so as to axially limit the rotary connecting portion 3, such that the rotary knob 1 and the rotary connecting portion 3 can only rotate and cannot move up and down along the axis.

Figure 6:
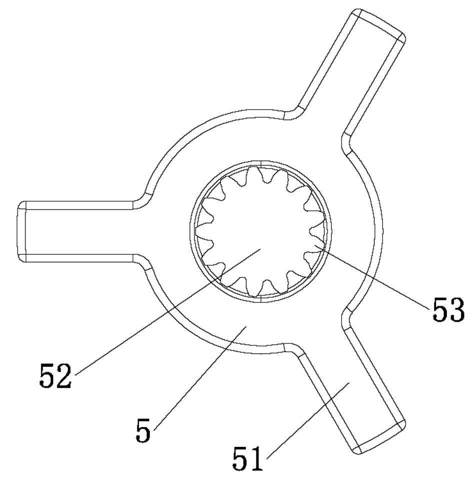
FIG. 6 is a front view of a rotary connecting seat.
Figure 7:
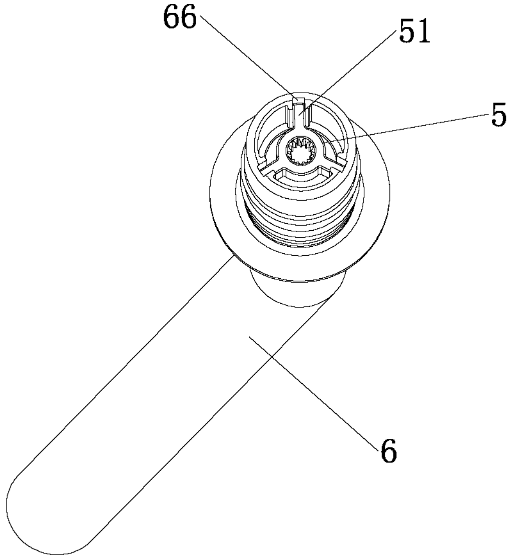
FIG. 7 is an assembly diagram of a rotary connecting seat and an angle suction pipe.
Figure 8:
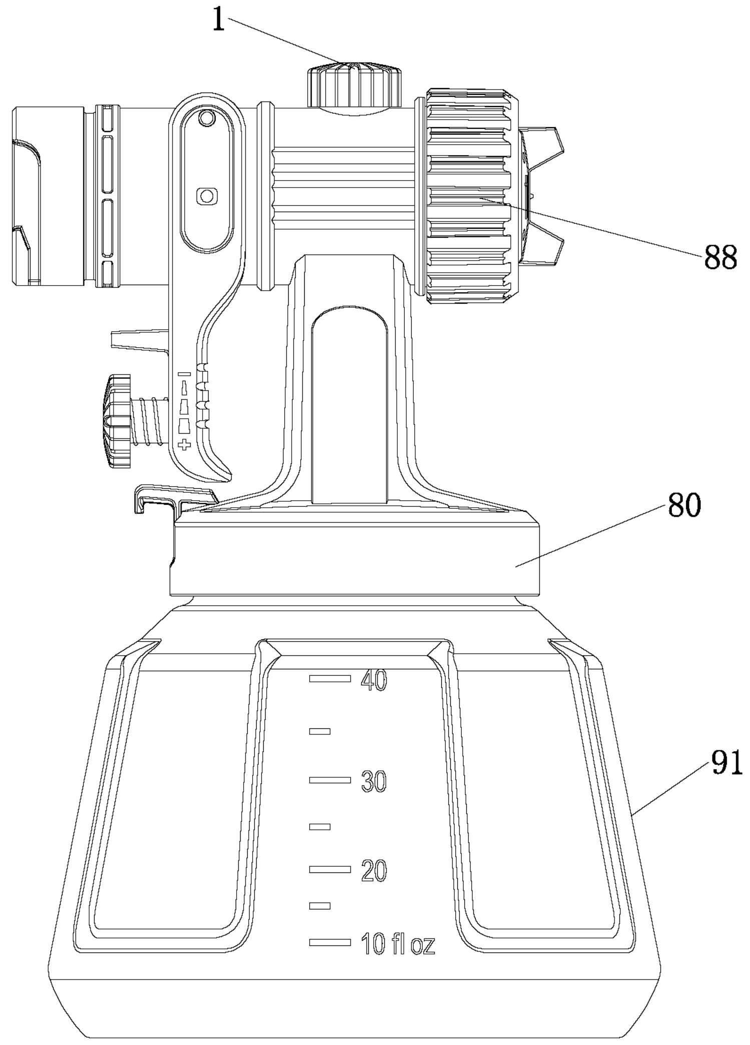
FIG. 8 is a schematic structural diagram of a spray gun.

As shown in FIGS. 6 and 7, the connecting rod 32 is connected to the angle suction pipe 6 through the rotary connecting seat 5 for convenient assembly and production. Three drive plates 51 are arranged in an annular array on an outer circular surface of the rotary connecting seat 5. A connecting hole 52 is arranged in a center of the rotary connecting seat 5. The connecting rod 32 is inserted into the connecting hole 52 to connect the rotary connecting seat 5 to the connecting rod 32. Three drive grooves 66 are formed in an annular array at the top of the straight pipe 61. The drive grooves 66 correspond to the drive plates 51 one to one. The drive plates 51 are movably inserted into the drive grooves 66. The drive plates 51 drive the angle suction pipe 6 to rotate through the drive grooves 66. Several internal connecting teeth 53 are arranged in an annular array on an inner circular surface of the connecting hole 52. Several external connecting teeth 321 are arranged in an annular array on an outer circular surface of the bottom of the connecting rod 32. The external connecting teeth 321 are inserted into the internal connecting teeth 53 and mesh with each other, such that reliable connection between the connecting rod 32 and the rotary connecting seat 5 can be guaranteed, moreover, relative rotation between the connecting rod 32 and the rotary connecting seat 5 can be prevented, and the rotary connecting seat 5 can rotate synchronously with the connecting rod 32.

The straight pipe 61 is also provided with a support ring 64. The support ring 64 is movably located below the sealing device of the spray gun. The support ring 64 is configured to support the sealing device and implement positioning of the sealing device.

Example 2

As shown in FIGS. 8-13, a spray gun includes a suction pipe rotating device. The spray gun also includes a material barrel 91, a gun body 80, a sealing device, a valve needle 83, a nozzle 86, an atomizing blast cap 87, a compression nut 88, a spring 84, a wrench 89 and a connecting pin 85. The gun body 80 is arranged at a top of the material barrel 91 through threads. The sealing device is arranged between the material barrel 91 and the gun body 80. An angle suction pipe 6 is movably inserted on the sealing device. A valve hole 82 and a material suction hole 81 in communication with each other are formed in the gun body 80. The material suction hole 81 is vertically arranged along an axis. The valve hole 82 is horizontally arranged. The material suction hole 81 and the valve hole 82 form a cross passage. The valve needle 83 is movably inserted into the valve hole 82. One end of the gun body 80 is sequentially provided with the nozzle 86, the atomizing blast cap 87 and the compression nut 88. The nozzle 86 is in communication with the valve hole 82. The compression nut 88 fixes the atomizing blast cap 87 and the nozzle 86 on the gun body 80 and tightly presses the atomizing blast cap and the nozzle on an end of the valve hole 82. The valve needle 83 is movably inserted into the valve hole 82. Two third sealing rings 903 are mounted on the valve needle 83 to implement seal between the valve needle 83 and the valve hole 82. The third sealing rings 903 are also located at one side of the material suction hole 81. The spring 84 is located at one end of the valve hole 82 away from the nozzle 86. Two ends of the spring 84 is abutted against a bottom of the valve hole 82 and an end of the valve needle 83 respectively for pressing the valve needle 83 on the nozzle 86. A top of the wrench 89 is rotatably mounted on a rotary pin 801 at the top of the gun body 80. The wrench 89 is rotatably connected to the valve needle 83 through the connecting pin 85. The connecting pin 85 is located between the third sealing rings 903 and the spring 84. The wrench 89 may control movement of the valve needle 83, so as to control an opening degree between the valve needle 83 and the nozzle 86 and further to adjust a spray amount. The gun body 80 further defines a first vent hole 801 in communication with the material barrel 91. The first vent hole 801 allows high pressure gas to be introduced. The sealing device includes a seal ring 92, a sealing disk 93 and a sealing gasket 94. An outer diameter of the seal ring 92 is the same as that of the top of the material barrel 91. The seal ring is configured to implement seal between the gun body 80 and the material barrel 91, and is clamped on the gun body 80. An outer circular surface of the sealing disk 93 is provided with a fifth sealing groove 934. The fifth sealing groove 934 is inserted on the seal ring 92. A top of the sealing disk 93 is provided with a fourth sealing groove 931 and vent posts 932. Four vent posts 932 are arranged. The vent posts 932 are arranged in an annular array at a bottom of the fourth sealing groove 931. A second vent hole 933 is further provided at the bottom of the fourth sealing groove 931. The sealing gasket 94 is hermetically mounted in the fourth sealing groove 931 and is abutted against the vent posts 932. The sealing gasket 94 is annular. Four vent slits 941 are provided on the sealing gasket 94 in an annular array. The vent slits 941 are located between adjacent vent posts 932, that is, the vent slits 941 and the vent posts 932 are alternately arranged. The vent slits 941 are configured to form one-way ventilation, and then high-pressure gas may enter the fourth sealing groove 931 through the vent slits 941 on the sealing gasket 94, and then enter the material barrel 91 through the second vent hole 933. The vent slits 941 are only capable of ventilation. The vent slits 941 can prevent the liquid raw material from entering above the sealing gasket 94 and restrict the raw material in the material barrel 91. The sealing gasket 94 is made of an elastic material. The vent posts 932 are configured to define a vent cavity between the sealing gasket 94 and the fourth sealing groove 931, such that the vent slits 941 of the sealing gasket 94 deform downwards to open the vent slits 941. The vent posts 932 are also used to support the sealing gasket 94. The vent slits 941 are elongated or cruciform. When the high-pressure gas enters above the sealing gasket 94 through the first vent hole 801, the high-pressure gas pushes the vent slits 941 to deform towards the vent cavity, that is, the vent slits 941 deform towards the fourth sealing groove 931, and the vent slits 941 are opened. The high-pressure gas enters the vent cavity, enters the material barrel 91 through the second vent hole 933, and then presses the raw material in the material barrel 91 towards the nozzle 86.

The straight pipe 61 is rotatably inserted on the sealing gasket 94 and the sealing disk 93. Since the sealing gasket 94 is made of an elastic material, such as rubber, sealing is formed between the sealing gasket 94 and the straight pipe 61. The support ring 64 is movably abutted against the sealing disk 93 to support the sealing disk 93 and prevent the sealing disk 93 and the sealing gasket 94 from moving axially.

The valve needle 83 is provided with a kidney-shaped first through hole 831. The first through hole 831 is movably inserted into the connecting rod 32, such that the connecting rod 32 and the valve needle 83 do not interfere with each other and work independently.

The technical principles of the disclosure have been described above in conjunction with the specific examples. These descriptions are intended only to explain the principles of the disclosure and should not be construed in any way as limiting the scope of the disclosure. Based on the explanation herein, other specific embodiments of the disclosure can readily occur to those skilled in the art without inventive effort, and these embodiments will fall within the scope of protection of the claims of the disclosure.

What is claimed is:

1. A suction pipe rotating device, comprising a rotary knob rotatably arranged at a top of a gun body of a spray gun;

a rotary connecting portion, wherein one end of the rotary connecting portion is arranged on the rotary knob and is movably inserted into a material suction hole of the spray gun; and an angle suction pipe comprising a straight pipe and an inclined pipe that are connected to each other, wherein the straight pipe is rotatably arranged in the material suction hole and is connected to the other end of the rotary connecting portion, the inclined pipe is obliquely arranged, and an end of the inclined pipe is close to a joint between a side wall and a bottom of a material barrel of the spray gun;

further comprising a suction pipe fitting sleeve arranged in the material suction hole of the spray gun, wherein the suction pipe fitting sleeve is internally provided with a positioning ring and several connecting ribs connected to the positioning ring and the suction pipe fitting sleeve separately, and the rotary connecting portion is rotatably inserted into the positioning ring.

2. The suction pipe rotating device according to claim 1, wherein the rotary connecting portion comprises:

a connecting support rotatably arranged in the material suction hole; and a connecting rod, wherein one end of the connecting rod is arranged on the connecting support, and the other end of the connecting rod is connected to the straight pipe.

3. The suction pipe rotating device according to claim 1, further comprising a positioning sleeve arranged on the top of the gun body and rotatably located between the rotary knob and the rotary connecting portion for limiting an axial position of the rotary connecting portion.

4. The suction pipe rotating device according to claim 1, further comprising a rotary connecting seat arranged at a bottom of the rotary connecting portion, wherein several drive plates are arranged on the rotary connecting seat, and the drive plates are movably inserted into a drive groove at a top of the straight pipe.

5. The suction pipe rotating device according to claim 1, wherein several external connecting teeth are arranged in an annular array on the rotary connecting portion, a connecting hole is arranged on the rotary connecting seat, several internal connecting teeth are arranged in an annular array on the connecting hole, the rotary connecting portion is inserted into the connecting hole, and the external connecting teeth mesh with the internal connecting teeth.

6. The suction pipe rotating device according to claim 1, wherein a feeding end of the inclined pipe is provided with a material suction slope configured to reduce a gap between an end of the inclined pipe and the material barrel.

7. The suction pipe rotating device according to claim 1, wherein several first sealing rings are arranged between the rotary connecting portion and the material suction hole.

8. The spray gun according to claim 7, wherein the sealing device comprises:

a seal ring arranged on the gun body and located at a top of the material barrel;

a sealing disk arranged on the seal ring and provided with a fourth sealing groove, and a second vent hole and several vent posts arranged at a bottom of the fourth sealing groove; and a sealing gasket hermetically arranged on the fourth sealing groove and provided with several vent slits, wherein the vent slits are located between adjacent vent posts.

9. The spray gun, comprising:

the suction pipe rotating device according to claim 1; and a sealing device arranged between a gun body and a material barrel.

* * * * *